(12) United States Patent
Ohbuchi (10) Patent No.: US 7,486,843 B2
(45) Date of Patent: Feb. 3, 2009

(54) IMAGE PROCESSING OVERLAYING ONE IMAGE ON ANOTHER

(75) Inventor: Eisaku Ohbuchi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 818 days.

(21) Appl. No.: 11/121,041

(22) Filed: May 4, 2005

(65) Prior Publication Data

US 2005/0249433 A1 Nov. 10, 2005

(30) Foreign Application Priority Data

May 6, 2004 (JP) .............................. 2004-137109

(51) Int. Cl.
- *G06K 9/32* (2006.01)
- *G06K 9/20* (2006.01)
- *G06K 9/36* (2006.01)
- *G09G 5/00* (2006.01)

(52) U.S. Cl. ...................... 382/298; 382/282; 382/284; 382/294; 345/660

(58) Field of Classification Search ................. 382/284, 382/298

See application file for complete search history.

(56) References Cited

U.S. PATENT DOCUMENTS

| | | | | |
|---|---|---|---|---|
| 4,797,942 A | * | 1/1989 | Burt ............................ | 382/284 |
| 5,880,778 A | * | 3/1999 | Akagi ...................... | 348/218.1 |
| 6,144,777 A | * | 11/2000 | Tada et al. ................... | 382/284 |
| 6,831,661 B1 | * | 12/2004 | Itoh et al. ................... | 345/629 |
| 7,110,007 B2 | * | 9/2006 | Odagawa ..................... | 345/634 |

FOREIGN PATENT DOCUMENTS

JP 2003-087555 A 3/2003

* cited by examiner

*Primary Examiner*—Jingge Wu
*Assistant Examiner*—Jose M Torres
(74) *Attorney, Agent, or Firm*—Sughrue Mion, PLLC (57) ABSTRACT

According to one aspect of the invention, an image processing apparatus scales the image size and places one image onto another to display a compose image. The image processing apparatus includes an input image storage, an image attribute storage, an internal working memory, an output image storage, a processing unit block calculator, and an image processor. The processing unit block calculator dynamically determines a processing unit block according to the size of the internal working memory, scaling factors, a display image position, a display image size, and the amount of processed image data. The image processor inputs the image data of front and back images based on the processing unit block and performs composition processing in each processing unit block by using the internal working memory.

9 Claims, 8 Drawing Sheets

IMAGE PROCESSING OVERLAYING ONE IMAGE ON ANOTHER

BACKGROUND OF THE INVENTION

1. Field of the Invention

The present invention relates to an image processing, more particularly, to an image processing for overlaying an image on another image.

2. Description of Related Art

A technique of combining a plurality of images and displaying a composite image is widely used in an operating system (OS) of a personal computer (PC) or the like. Recently, some mobile terminal, embedded devices and so on have a function to create and display a composite image. A technique of efficiently creating and displaying a composite image is demanded since there is a limit to the memory size and processing speed in these devices.

To meet this demand, Japanese Unexamined Patent Publication No. 2003-87555 (Odakawa), for example, proposes a technique for producing a composite image from the two images by dividing each of the two images into a plurality of tile images and performing composition processing for each tile image. Since this technique divides the images, it is possible to perform image composition with a low processor load.

The approach disclosed in the above document divides the images individually into the tiled images of prescribed size, and then combine each pare of tiled images. It has now been discovered that, since a block size for composition processing is fixed to single tile size, it is difficult to perform composition process locating an overlay image on a pixel-to-pixel basis. Furthermore, image composition processing with image scaling is not examined in the above document.

A general method of creating a composite image with image scaling is to scale each image separately and combine the scaled images, or to scale one image and overlay another image thereon as scaling it. These methods, however, need to temporarily store each scaled image data and thus requires a large memory.

SUMMARY OF THE INVENTION

According to an aspect of the present invention, there is provided a mobile terminal scaling a back image and a front image each with a predetermined scaling factor and overlaying the front image on the back image to display a composite image. The mobile terminal includes an input image storage storing input image data of a front image and a back image; an image attribute storage storing scaling factors, display image position and display image size of the front image and the back image; an internal working memory used for performing composition processing of the image data of the front image and the back image stored in the input image storage; an output image storage storing processed image data; a processing unit block calculator dynamically determining a processing unit block based on capacity of the internal working memory, the scaling factors, the display image position and the display image size of the front image and the back image stored in the image attribute storage, and an amount of processed image data updated dynamically each time composition processing in each processing unit block ends; and an image processor producing composite image data by repeatingly dynamically obtaining the processing unit block determined by the processing unit block calculator, partially obtaining data from the image data of the front image and the back image stored in the input image storage based on the processing unit block, the scaling factors, the display image position and the display image size of the front image and the back image stored in the image attribute storage, and the amount of processed image data updated dynamically each time composition processing in each processing unit block ends, partially generating composite image data by composition processing within the processing unit block using the internal working memory, and outputting the data to the output image storage. This configuration allows scaling the images and producing a composite image from two images without consuming much memory, putting heavy load on a processor, nor consuming much power.

According to another aspect of the present invention, there is provided an image processing program product, in a computer readable medium, for scaling a back image and a front image each with predetermined scaling factors and overlaying the front image on the back image to display a composite image. The image processing program product includes instructions for dynamically determining a processing unit block based on capacity of an internal working memory, scaling factors, display image position and display image size of a front image and a back image, and an amount of processed image data updated dynamically each time composition processing in each processing unit block ends; partially obtaining data from the image data of the front image and the back image based on the processing unit block, the scaling factors, the display image position and the display image size of the front image and the back image, and the amount of processed image data updated dynamically each time composition processing in each processing unit block ends, and partially generating composite image data by composition processing within the processing unit block using the internal working memory; and completing composite image data causing a computer to repeat the determination of a processing unit block and the partial generation of composite image data until composition processing in an entire image ends, and combining the partially generated composite image data. This program product allows scaling the images and producing a composite image from two images without consuming much memory, putting heavy load on a processor, nor consuming much power.

According to yet another aspect of the present invention, there is provided an image processing apparatus overlaying a front image on a back image to produce a composite image, comprising: an internal working memory used for image composition processing of the image data of the front image and the back image, a processing unit block calculator dynamically determining a processing unit block based on the internal working memory capacity and data amount of the front image and the back image contained in the processing unit block, and an image processor producing the composite image by repeating partial composite data image producing process which stores image data contained in the determined processing unit block to the internal working memory and performs image composition process of the front image and the back image contained in the determined processing unit block. This method allows producing a composite image from two images without consuming much memory, putting heavy load on a processor, nor consuming much power.

The present invention provides an image processing apparatus, a mobile terminal, an image processing program, and an image processing method capable of enlarging or reducing the image size and creating a composite image from two images with relatively low memory consumption, light load on a processor, and less power consumption.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
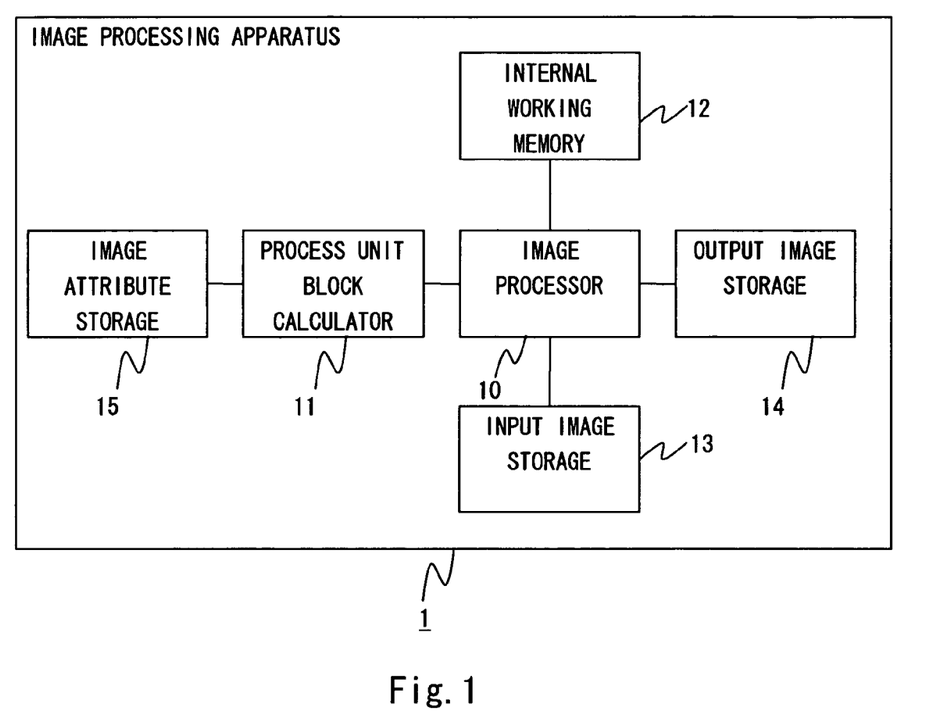
FIG. 1 is a block diagram showing the configuration of an image processing apparatus of the present invention.

FIG. 1 is a block diagram showing the configuration of an image processing apparatus according to a first embodiment of the invention. An image processing apparatus 1 is, for example, a mobile terminal such as a mobile phone or a Personal Digital Assistant (PDA), which has a function to display an image. The image processing apparatus 1 includes an image processor 10, a processing unit block calculator 11, an internal working memory 12, an input image storage 13, an output image storage 14, and an image attribute storage 15.

The image processor 10 receives the data of two images stored in the input image storage 13 and performs composition processing. The image processor 10 is composed of a central processing unit (CPU) or the like. The processing unit block calculator 11 performs calculation for determining a processing unit size of a composition processing by the image processor 10. The processing unit block calculator 11 is also composed of CPU or the like. Though the image processor 10 and the processing unit block calculator 11 are separate units in FIG. 1, they may be implemented by a single CPU. Each of the processing unit block calculator 11 and the image processor 10 may have a dedicated chip or they may perform each processing by a program.

The internal working memory 12 is a storage device used for the image processor 10 to perform composition processing, and it is composed of Random Access Memory (RAM) or the like. Though the memory size is not specified, this invention is particularly effective when the capacity of the internal working memory 12 is limited. The input image storage 13 stores image data of two images to be processed by the image processor 10. It is also composed of RAM or hard disk drive (HDD). The output image storage 14 stores the composite image data processed by the image processor 10. It is also composed of RAM or HDD. The image attribute storage 15 stores a position, a scaling factor, and an image size used in performing composition processing by the image processor 10. It is also composed of RAM or HDD. Though the internal working memory 12, the input image storage 13, the output image storage 14, and the image attribute storage 15 are separate units in FIG. 1, all or two or three of those units may be stored in the same RAM or HDD.

Figure 2:
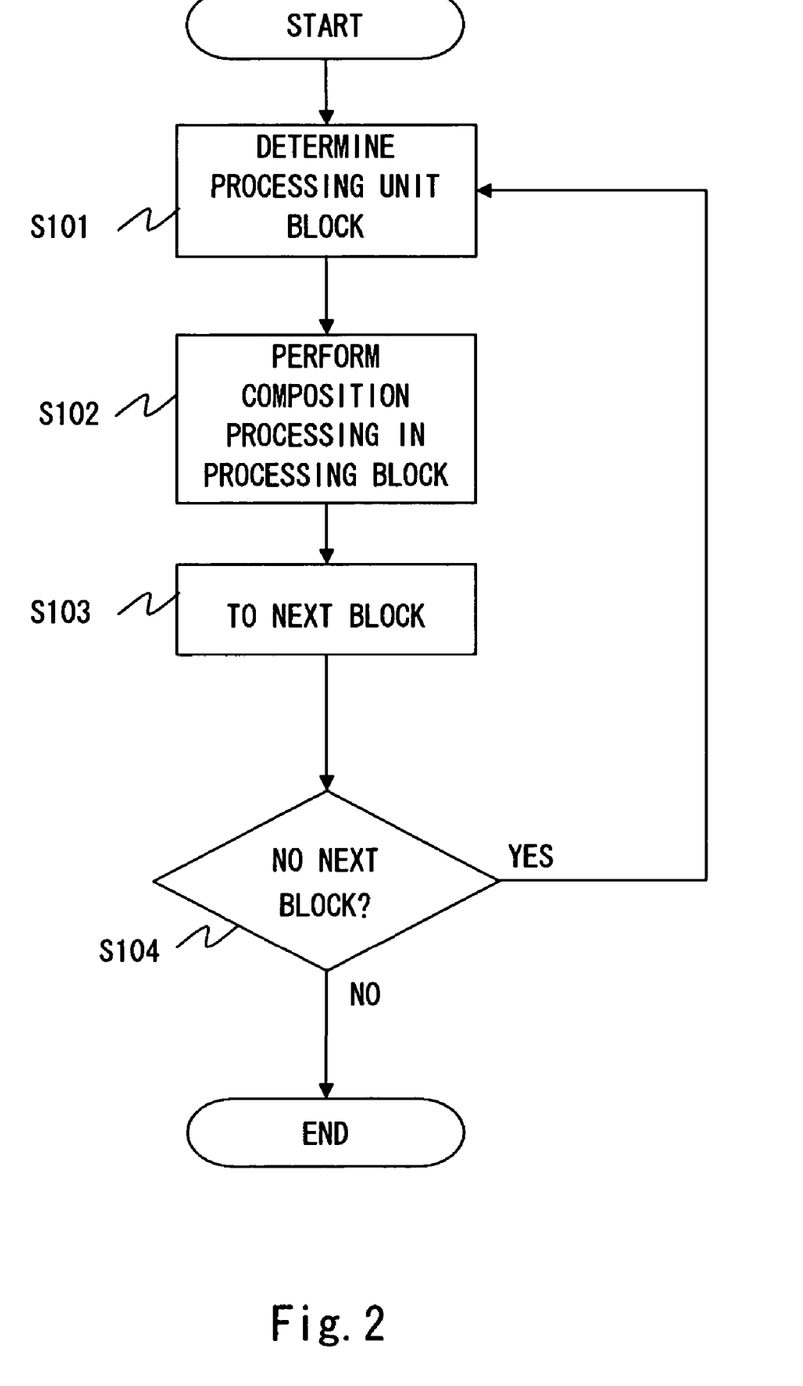
FIG. 2 is a flowchart showing the process flow of an image processing apparatus of the present invention.

Referring next to the flowchart of FIG. 2, the process flow of the image processing apparatus of the invention is described hereinafter.

First, the processing unit block calculator 11 determines a processing unit block for composition processing (S101). A method for determining the processing unit block is detailed later. The processing unit block determined in this step dynamically changes according to the conditions of composition processing. Next, the image processor 10 performs composition processing based on the processing unit block determined by the processing unit block calculator 11 (S102). A method of the composition processing is also detailed later. During the composition processing, the image processor 10 writes the composite data into the output image storage 14.

When the composition processing in the block is completed, the processing proceeds to the next block (S103). When no more next block exists (S104), the composition processing ends since the image processing has been performed in all the blocks.

Figure 3:
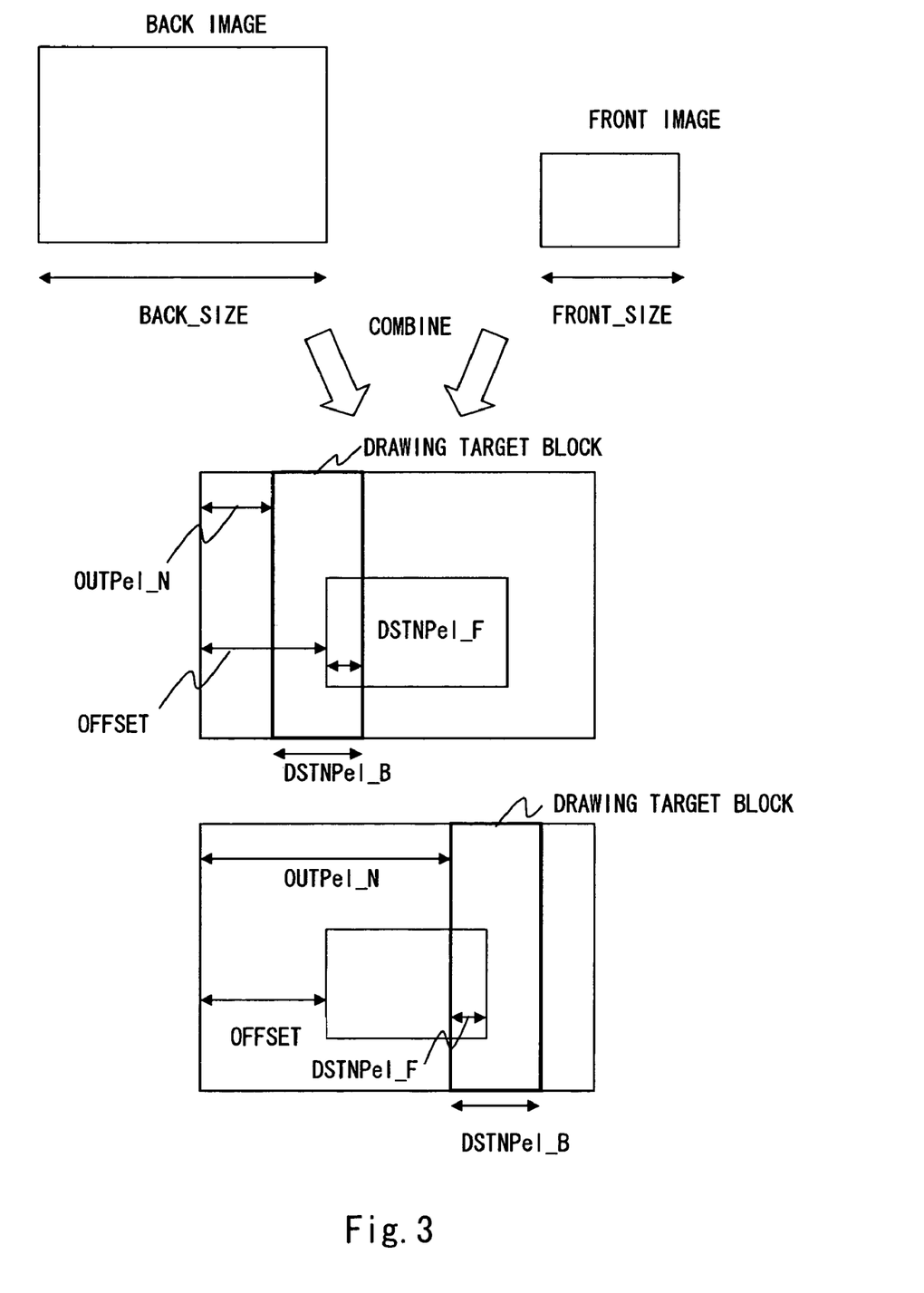
FIG. 3 is a view to describe parameters in the present invention.

A method for determining a processing unit block is described in detail hereinafter. The following description describes a case where a front image is overlaid on a back image. FIG. 3 is a view showing a composite image consisting of two images each of which is scaled (enlarged or reduced) as required. The frame with a thick line indicates a target drawing block, namely a subject processing unit block. FIG. 3 shows the parameters necessary for determining a processing unit block as well. In FIG. 3, BACK_SIZE indicates the number of pixels across the back image, and FRONT_SIZE indicates the number of pixels across the front image.

OFFSET is the overlap position displacement in the lateral direction of the front image relative to the back image. OutPel_N is the number of pixels in the lateral direction indicating the position of a present processing unit block, which is a value determined by the amount of processed image data. OutPel_N varies by processing unit blocks.

DSTNPel_F indicates the number of pixels in the lateral direction of a front image contained in the determined processing unit block. DSTNPel_F also represents an output image size of the front image to the internal working memory 12 modified with a scaling factor of the front image. The DSTNPel_F represents indirectly the amount of front image data applied to the internal working memory 12 from the input image storage 13 for the determined processing unit.

Similarly, DSTNPel_B indicates the number of pixels in the lateral direction of a front image contained in the determined processing unit block. DSTNPel_B also represents an output image size of the back image to the internal working memory 12 modified with a scaling factor of the back image.

DSTNPel_F and DSTNPel_B vary from processing unit block to processing unit block.

A maximum processing unit block determined by the size of the internal working memory 12 is also used for determining a processing unit block. The maximum processing unit blocks are defined for the front image and the back image respectively, and the maximum processing unit blocks represent the maximum data amount capable of written into the internal working memory 12 for the front image and the back image respectively. The maximum processing unit blocks may be set to the same value or different.

An initialization process for determining a processing unit block sets an initial value of DSTNPel_F and DSTNPel_B by the following way. DSTNPel_F is the smaller one of a product of a front image scaling factor times an input front image size in the lateral direction and a product of a front image scaling factor times an front image maximum lateral size capable of being stored in the front image maximum processing unit (the latter product is referred to as the front image maximum processing width, hereinafter). DSTNPel_B is the smaller one of a product of a back image scaling factor times an input back image size in the lateral direction and a product of a back image scaling factor times an back image maximum lateral size capable of being stored in the back image maximum processing unit (the latter product is referred to as the back image maximum processing width, hereinafter).

Figure 4:
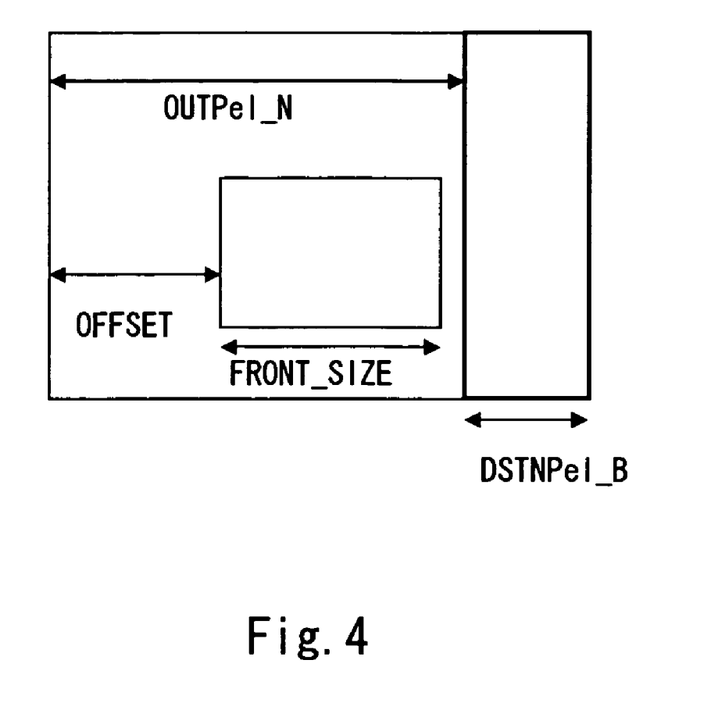
FIG. 4 is a view showing an example of a processing unit block determination method of the present invention.

A block size is determined by dividing conditions into several cases in the following way. First, if FRONT_SIZE+OFFSET≦OutPel_N, that is, the block to be processed has passed the front image as shown in FIG. 4, the composition processing can be performed without being affected by the front image. Thus, the processing unit block is determined to be DSTNPel_B, namely the back image maximum processing width in the composite image derived from the back image maximum processing unit. Since the front image is not processed in this case, DSTNPel_F=0.

Figure 5:
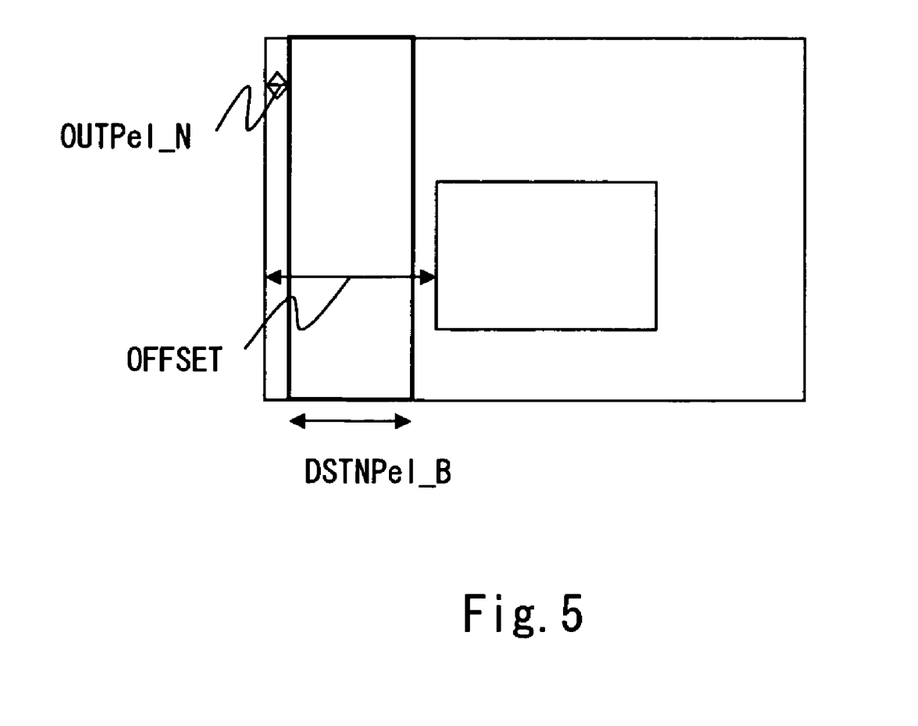
FIG. 5 is a view showing an example of a processing unit block determination method of the present invention.

If the above condition is not satisfied and OutPel_N+DSTNPel_B≦OFFSET, that is, the processing unit block to be processed has not reached the front image and will not overlap with the front image as shown in FIG. 5, the composition processing can be performed without being affected by the front image. The processing unit block is determined to be DSTNPel_B in this case as well. Since the front image is not processed, DSTNPel_F=0.

Figure 6:
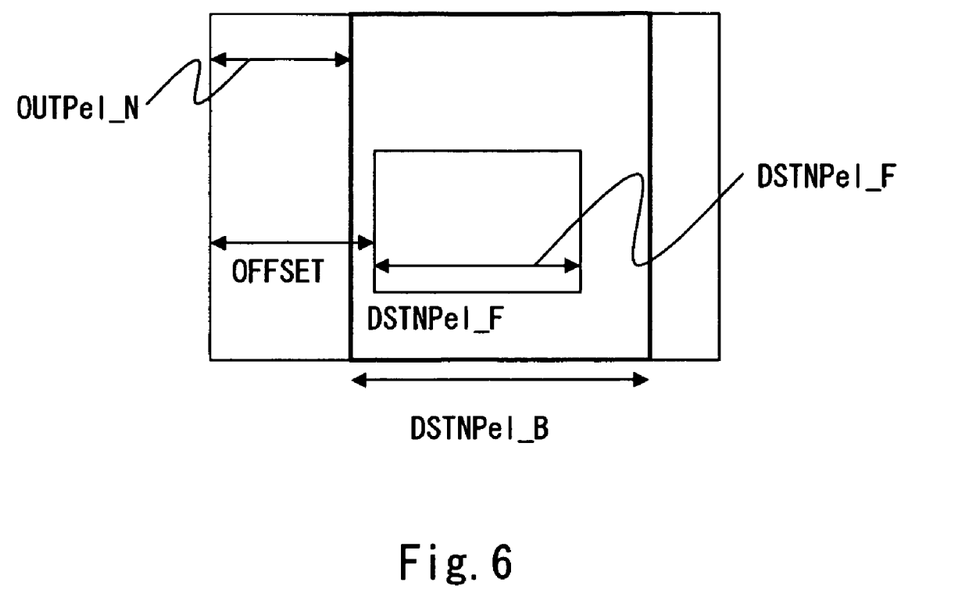
FIG. 6 is a view showing an example of a processing unit block determination method of the present invention.

If the above conditions are not satisfied and OutPel_N<OFFSET and OutPel_N+DSTNPel_B>OFFSET+FRONT_SIZE and DSTNPel_F is equal to or less than the front image maximum processing width, that is, the preceding processing unit block processed does not reach the front image and the entire front image will be processed in the next processing unit block as shown in FIG. 6, it is possible to enter the data of the front image into the processing unit block of DSTNPel_B. The processing unit block is therefore determined to be DSTNPel_B, namely the back image maximum processing width.

Figure 7:
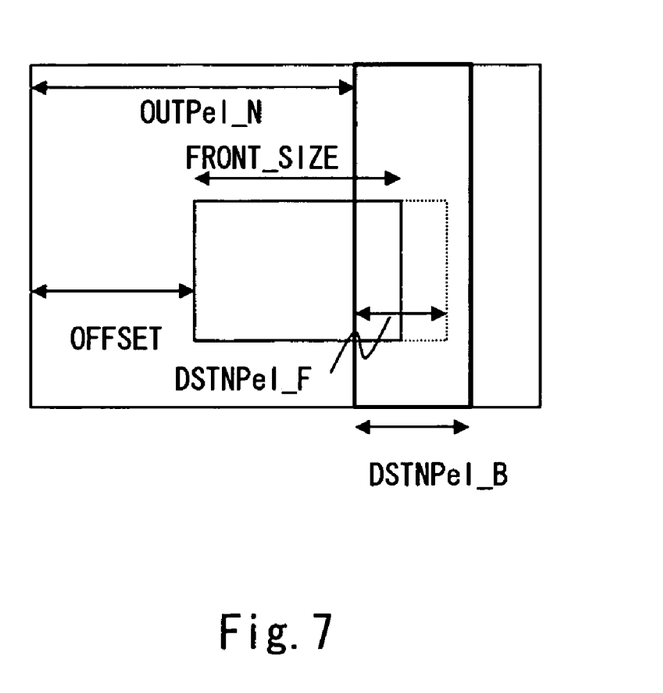
FIG. 7 is a view showing an example of a processing unit block determination method of the present invention.

If the above conditions are not satisfied and OutPel_N+DSTNPel_F=FRONT_SIZE and OutPel_N≠0, that is, the block to be processed overlaps with the front image and the entire front image will be processed upon completion processing in the next block as shown in FIG. 7, it is possible to enter the data of the front image into the block of DSTNPel_B. The processing unit block is therefore determined to be DSTNPel_B. DSTNPel_F is FRONT_SIZE+OFFSET-OutPel_N since only the remaining part is to be processed.

Figure 8:
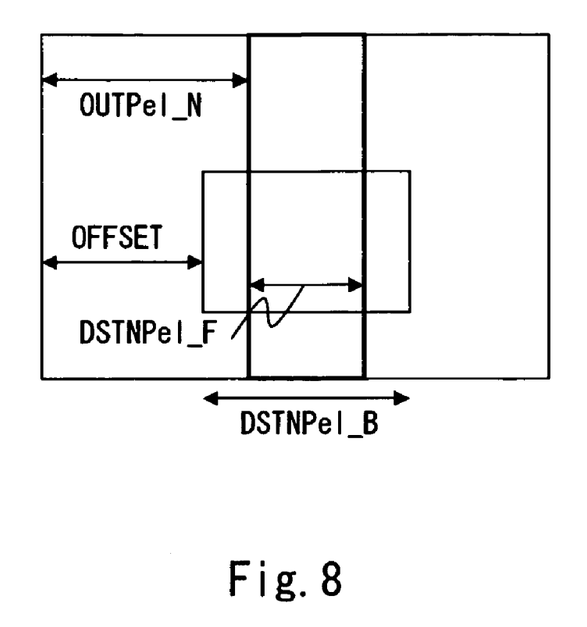
FIG. 8 is a view showing an example of a processing unit block determination method of the present invention.

If the above conditions are not satisfied and OFFSET<OutPel_N, that is, the preceding processing unit block overlaps with the front image and the entire front image will not be processed upon completion of processing in the next processing unit block as shown in FIG. 8, the processing unit block is determined to be the smaller one of DSTNPel_F and DSTNPel_B, namely one of the front image maximum processing width and the back image maximum processing width. DSTNPel_F and DSTNPel_B are set to the value determined as the processing unit block.

Figure 9:
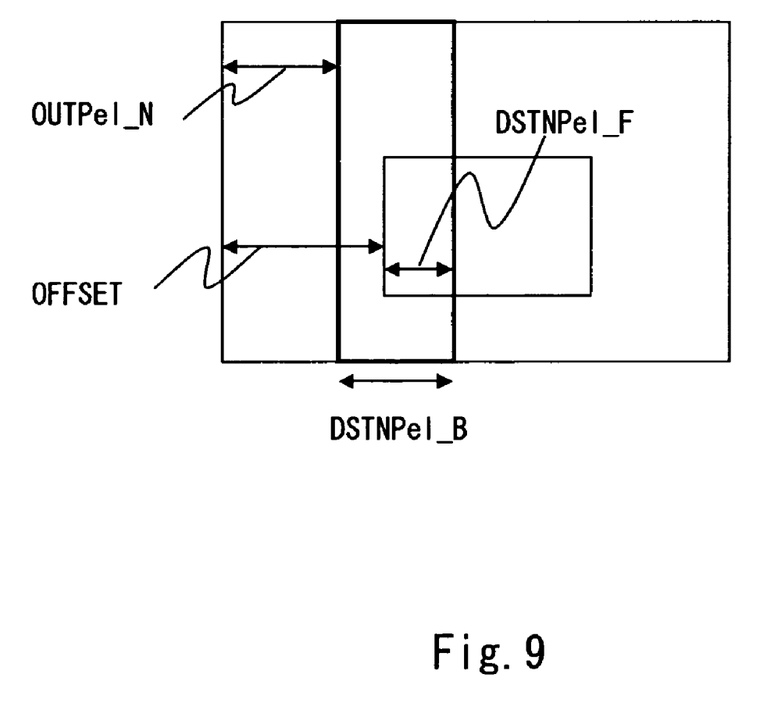
FIG. 9 is a view showing an example of a processing unit block determination method of the present invention.

In the other case where the block to be processed has not reached the front image and the next block to be processed will reach and overlap with the front image, as shown in FIG. 9. the processing unit block is determined to be the smaller one of OFFSET+DSTNPel_F-OutPel_N and the back image maximum processing width. In this case, DSTNPel_F is DSTNPel_B+OutPel_N-OFFSET, and STNPel_B is the smaller one of OFFSET+DSTNPel_F-OutPel N and the back image maximum processing width.

The processing unit block is determined by dividing the conditions into several cases in this way. Composition processing is performed by inputting image data according to the processing unit block. Dynamically determining the processing unit block according to different overlay conditions to determine the processing unit block based on the internal working memory capacity for the front image and the back image allows composition processing to be performed with efficient use of a limited memory capacity.

Figure 10:
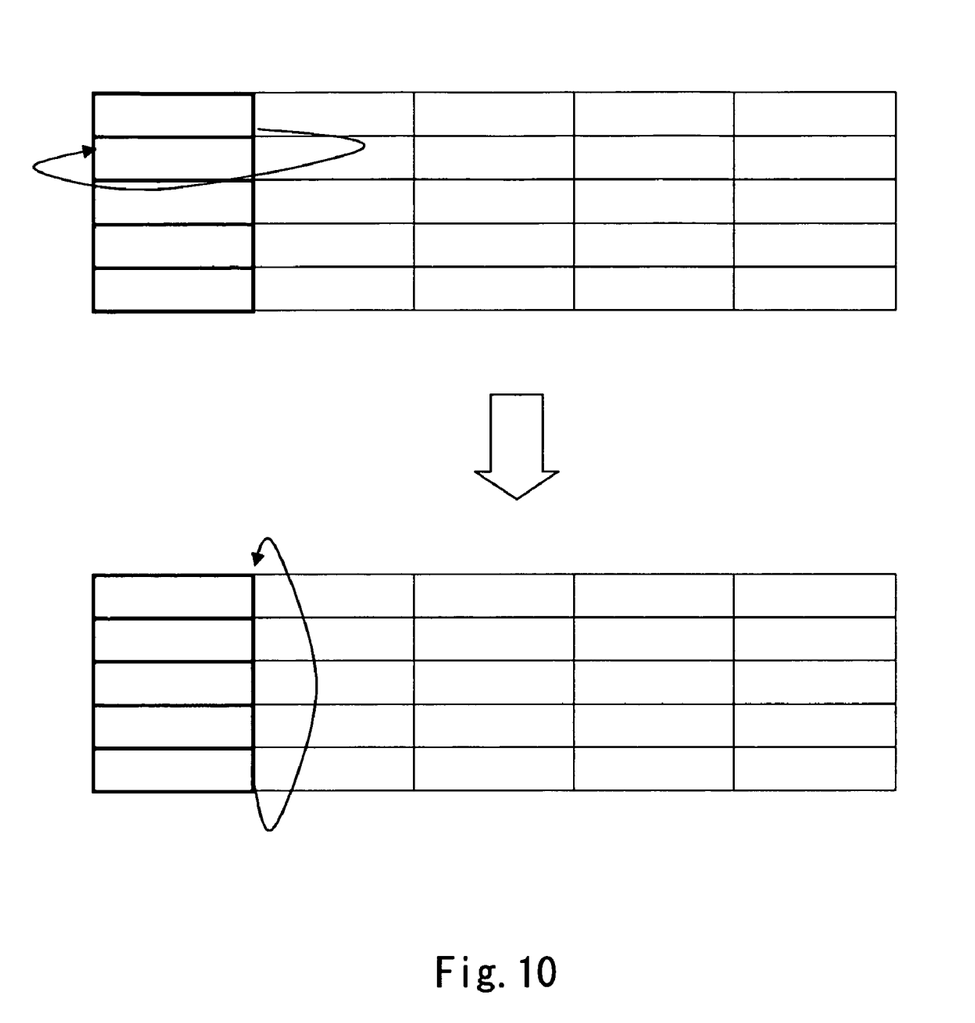
FIG. 10 is a view showing a composition process of the present invention.

A method for performing composition processing based on the processing unit block is described in detail hereinafter. As shown in FIG. 10, the composition processing is performed for each line in the longitudinal direction in accordance with the width of a processing unit block. After completing the processing in the longitudinal direction, the next processing unit block is calculated and the composition processing is performed again on the block for each line in the longitudinal direction.

Figure 11:
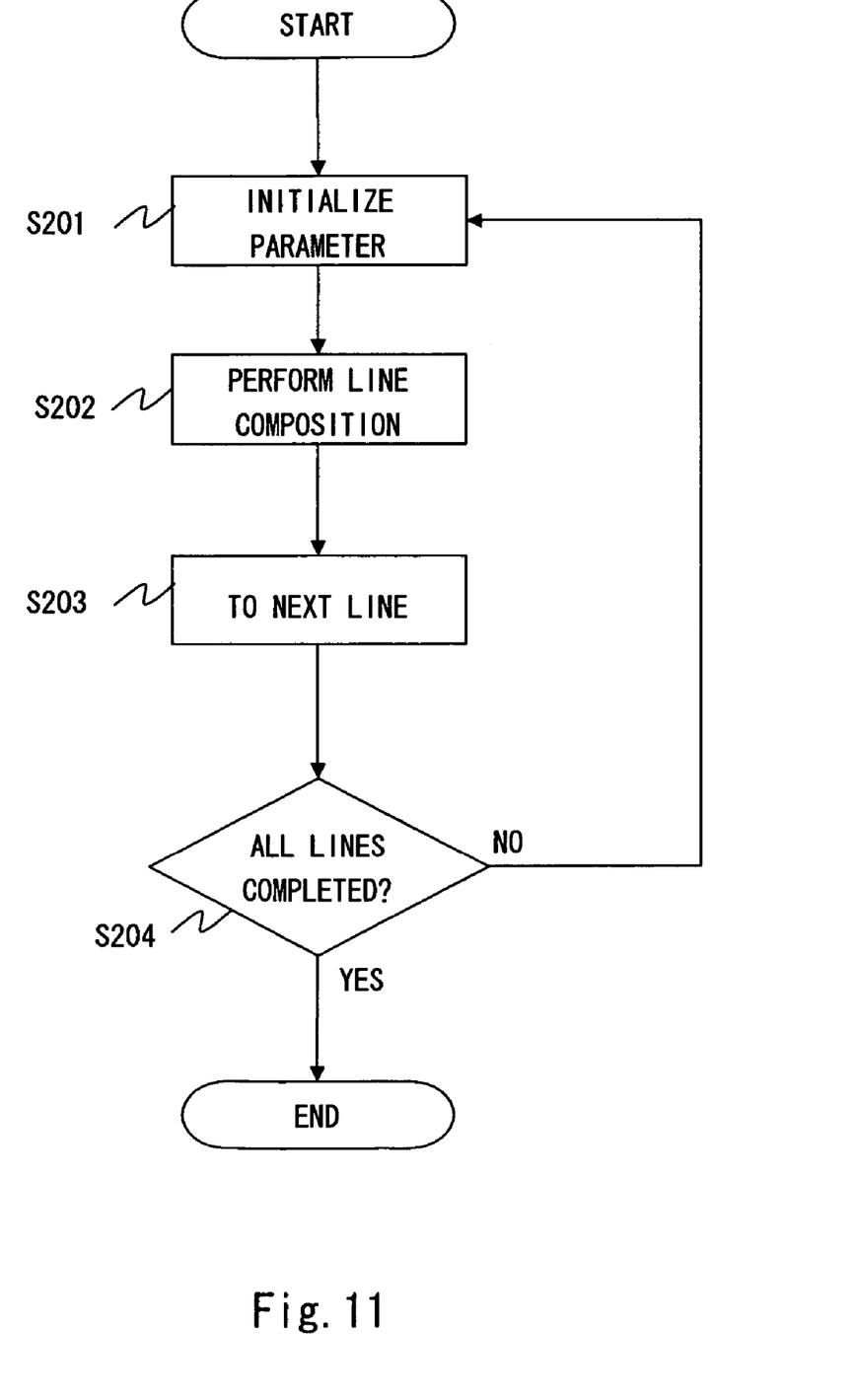
FIG. 11 is a flowchart showing the process flow of an image processing apparatus of the present invention.

The flow of the composition processing is described below with reference to the flowchart of FIG. 11.

First, a parameter to be used in a line to be processed is initialized according to the processing unit block determined above (S201). After the initialization, data is input to the line in accordance with the processing unit block and image composition is performed (S202). The composition processing enlarges or reduces the image data according to the enlargement/reduction rate as normal. When combining the image data, if the front image is included in the line, data of the front image is written; if not, data of the back image is written. At this time, image correction such as antialiasing may be performed. The composition processing method in a processing unit block is not particularly limited.

When the composition processing of this line is completed, the processing proceeds to the next line (S203). At this time, the parameter is initialized again according to the next line. This process is repeated for each line in the longitudinal direction. When all the lines are processed (S204), the composition processing of this block ends, and the process proceeds to the calculation of the next processing unit block.

This embodiment dynamically calculates a processing unit block in accordance with a working memory size and performs composition processing for each line in each calculated processing unit block. This eliminates the need for temporarily storing enlarged or reduced images and composite images into a memory since the images are stored in an output image storage as needed. This saves the temporary memory and eliminates the data storing process into the temporary memory resulting in increased processing speed. Further, since the processing is performed per working memory, it is possible to reduce load on a bus and achieve power saving. Furthermore, since the processing is performed in each divided block, it is compatible with image data of any size.

Other Embodiments

In the above embodiment, image data is divided in the longitudinal direction to determine a processing unit block. This is simply because a memory array of image data is normally arranged in the lateral direction and thus the operating efficiency is higher when dividing the data in the longitudinal direction. Image data may be divided in the lateral direction depending on the format of the image data.

Further, though the above embodiment describes the case of performing enlargement or reduction of the image size, the enlargement/reduction rate of either or both of the front and back images may be 1.0, that is, the image composition processing may not include enlargement or reduction of the image size.

It is apparent that the present invention is not limited to the above embodiment that may be modified and changed without departing from the scope and spirit of the invention. Though fixed maximum processing units are defined for the front image and the back image in the above embodiment, the processing blocks may be determined such that the total data amount of the front image and the back image contained in the processing block is equal to or comes closer to the predetermined value corresponding to the capacity of internal working memory.

What is claimed is:

1. A mobile terminal scaling a back image and a front image each with a predetermined scaling factor and overlaying the front image on the back image to display a composite image, the mobile terminal comprising:

an input image storage storing input image data of a front image and a back image;

an image attribute storage storing a scaling factor, a display image position and a display image size of the front image and the back image;

an internal working memory used when performing composition processing of the image data of the front image and the back image stored in the input image storage;

an output image storage storing processed image data;

a processing unit block calculator dynamically determining a processing unit block according to capacity of the internal working memory, the scaling factor, the display image position and the display image size of the front image and the back image stored in the image attribute storage, and an amount of processed image data updated dynamically each time composition processing in each processing unit block ends; and an image processor producing composite image data by repeating dynamically obtaining the processing unit block determined by the processing unit block calculator, partially obtaining data from the image data of the front image and the back image stored in the input image storage based on the processing unit block, the scaling factor, the display image position and the display image size of the front image and the back image stored in the image attribute storage, and the amount of processed image data updated dynamically each time composition processing in each processing unit block ends, generating partial composite image data by composition processing within the processing unit block using the internal working memory, and outputting the data to the output image storage.

2. The mobile terminal of claim 1, wherein the image processor performs composition processing by dividing the image data of the front image and the back image and the output image data in a longitudinal direction.

3. An image processing program product, in a computer readable medium, for scaling a back image and a front image each with a predetermined scaling factor and overlaying the front image on the back image to display a composite image, the image processing program product comprising instructions for:

dynamically determining a processing unit block according to capacity of an internal working memory, scaling factors, display image position and display image size of a front image and a back image, and an amount of processed image data updated dynamically each time composition processing in each processing unit block ends;

partially obtaining data from the image data of the front image and the back image based on the processing unit block, the scaling factors, the display image position and the display image size of the front image and the back image, and the amount of processed image data updated dynamically each time composition processing in each processing unit block ends, and generating partially composite image data by composition processing within the processing unit block using the internal working memory; and completing composite image data causing a computer to repeat the determination of a processing unit block and the partial generation of composite image data until composition processing in an entire image ends, and combining the partially generated composite image data.

4. The image processing program product of claim 3, wherein the composition processing is performed by dividing the image data of the front image and the back image and the output image data in a longitudinal direction.

5. An image processing apparatus overlaying a front image on a back image to produce a composite image, comprising: an internal working memory used for image composition processing of the image data of the front image and the back image; a processing unit block calculator dynamically determining a processing unit block based on the internal working memory capacity and data amount of the front image and the back image contained in the processing unit block; and an image processor producing the composite image by repeating partial composite data image producing process which stores image data contained in the determined processing unit block to the internal memory and performs image composition process of the front image and the back image contained in the determined processing unit block, wherein the processing unit block calculator determines the processing unit block based on attribute data including scaling factors. display image position and display image size.

6. The image processing apparatus of claim 5, wherein the processing unit block calculator determines the processing unit block based on the maximum capacity of the internal working memory assigned to the front image and the back image, and input data amount of the front image and the back image to the internal working memory.

7. The image processing apparatus of claim 6, wherein the processing unit block calculator determines the processing unit block so one of the input data amount of the front image and the back image as to be the maximum capacity assigned thereto.

8. The image processing apparatus of claim 5, wherein the image processor producing the composite image as performing scaling process.

9. The image processing program product of claim 5, wherein the composition processing is performed by dividing the image data of the front image and the back image and the output image data in a longitudinal direction.

* * * * *